United States Patent [19]

Suzuki et al.

[11] 4,041,235

[45] Aug. 9, 1977

[54] SYNTHETIC RESIN COMPOSITION

[75] Inventors: Akira Suzuki, Shibukawa; Ituo Orihara, Maebashi; Akira Ishida, Fujimi, all of Japan

[73] Assignee: Kanto Denka Kogyo Co., Ltd., Tokyo, Japan

[21] Appl. No.: 578,508

[22] Filed: May 19, 1975

[30] Foreign Application Priority Data

May 29, 1974  Japan .................................. 49-59790

[51] Int. Cl.² ........................ B32B 27/38; B32B 27/30
[52] U.S. Cl. ................... 428/413; 428/418; 428/463; 428/520; 428/522; 526/273
[58] Field of Search .............. 260/80.72; 428/413, 428/414, 416, 418, 461, 463, 500, 511, 510, 520, 522; 526/273

[56] References Cited

U.S. PATENT DOCUMENTS

| | | | |
|---|---|---|---|
| 2,684,954 | 7/1954 | Miller | 260/80.72 X |
| 2,729,625 | 1/1956 | Hurwitz | 260/80.72 |
| 2,999,782 | 9/1961 | Justice et al. | 428/500 X |
| 3,251,817 | 5/1966 | Hahn et al. | 428/413 X |
| 3,379,665 | 4/1968 | Lyon et al. | 428/463 X |
| 3,432,340 | 3/1969 | Mathis et al. | 428/463 X |
| 3,440,200 | 4/1969 | Lindemann et al. | 260/80.72 X |
| 3,935,374 | 1/1976 | Yoshikawa et al. | 526/273 X |
| 3,952,136 | 4/1976 | Yoshikawa et al. | 428/463 |

FOREIGN PATENT DOCUMENTS

| | | |
|---|---|---|
| 647,797 | 12/1964 | Belgium |
| 538,913 | 7/1969 | Japan |
| 30,400 | 12/1969 | Japan |
| 1,075,694 | 7/1967 | United Kingdom |

*Primary Examiner*—Harold Ansher
*Attorney, Agent, or Firm*—Flynn & Frishauf

[57] ABSTRACT

A significant improvement in thermal stability and decreased gas permeability and water vapor transmission of vinylidene chloride copolymer resin are achieved by the presence of about 0.5 — about 10% by weight of glycidyl methacrylate as an internal heat stabilizer in the polymer chain.

11 Claims, No Drawings

SYNTHETIC RESIN COMPOSITION

BACKGROUND OF THE INVENTION

This invention relates to a resin composition which comprises a vinylidene chloride copolymer having increased thermal stability and decreased gas permeability and water vapor transmission; and to packaging materials prepared therefrom. In particular, the present invention relates to a vinylidene chloride copolymer which contains about 0.5 — about 10% by weight of glycidyl methacrylate as an internal heat stabilizer in the polymer chain.

Polyvinylidene chloride resins have been used, in the form of film or sheet or container, for wrapping and packaging foodstuffs, medicines and other materials because of its desirable characteristics, in particular, low gas permeability. However, there are difficulties in forming or molding a resin which has been prepared only from a vinylidene chloride monomer, since the softening point of such a resin is usually so high — nearly approaching the decomposition point. Therefore, copolymers of vinylidene chloride with one or more copolymerizable monomers, for example vinyl chloride, vinyl acetate, acrylonitrile, methacrylates and allyl esters, have been employed to reduce the difficulties. Generally, additives such as a heat stabilizer, plasticizer and light stabilizer must be added to the copolymer resins to improve the properties thereof. For example, commercially available vinylidene chloride copolymer compositions contain usually about 85 - 95% by weight of vinylidene chloride component and about 15 - 5% by weight of vinyl chloride component and additionally about 2 - 5 PHR* of heat stabilizer (e.g. epoxidated soy bean oil), about 2 - 5 PHR of plasticizer (e.g. dibutyl sebacate or phthalyl butylglycolate) and minor light stabilizer. Of the additives, for example, epoxidated soy bean oil as a heat stabilizer emits an unpleasant oily odor and the odor is carried into articles made from a resin composition containing it. Thus where materials such as foodstuffs and medicines are wrapped by or packaged in film, sheet, bottle, etc. made of such resin composition the unpleasant odor tends to transfer to the contents in a length of time. Further, certain additives have less compatibility with the resin and later may exude gradually to the surface of articles to cause some problem.

*Part per hundred parts of resin.

DETAILED DESCRIPTION OF THE INVENTION

According to the present invention we provide a composition which comprises a resin prepared by copolymerizing about 0.5 — about 10% by weight of glycidyl methacrylate monomer, about 95 — about 70% by weight of vinylidene chloride monomer and the balance of at least one other compolymerizable vinyl monomer.

We have found that the composition exhibits improved thermal stability and has good moldability without further addition of any heat stabilizer and plasticizer which have been necessary for the conventional analogous resins. Thus, articles made from the present composition emit no odors resulting from additives and from thermal decomposition of resin during forming process and use thereof.

Further according to the present invention we provide packaging materials having improved thermal stability which are prepared from the present resin composition.

We have found that a film or sheet which has been prepared from the present resin composition shows decreased gas permeability and that this property is retained even at a high humidity.

Therefore, according to the present invention, packaging materials having improved thermal stability and decreased gas permeability and water vapor transmission are provided.

In addition, it has been found that the film or sheet shows a good adhesiveness to other substrates such as plastic film or sheet, paper sheet and aluminium foil. Therefore, the present film or sheet is suitable for use in producing a composite laminate having properties improved by any appropriate substrate.

We believe that these and other advantages achieved by the present invention result from the inclusion of about 0.5 — about 10% by weight of glycidyl methacrylate as an internal heat stabilizer in the copolymer chain. Without wishing to be restricted by theory, it is believed that the epoxide group of glycidyl methacrylate component renders the copolymer thermally stable and that the glycidyl methacrylate component inhibits possible allylic decomposition which might occur in the polymeric chain releasing hydrogen chloride. Further it is believed that the decreased gas permeability and water vapor transmission result from a small proportion of additive or additives, if any, present in the composition and also from high homogeneity and high density of the resin which is caused by incorporating the glycidyl methacrylate.

The present resin composition may be used advantageously for the production of packaging materials such as film, sheet, bag and bottle, which are very suitable for wrapping, packing or storing foodstuffs, medicines and the like on account of the useful properties as hereinbefore mentioned.

The present resin composition may be formed into film or sheet by any conventional technique, conveniently by melt extrusion particularly using T-die or by inflation technique. A sheet, which is conveniently prepared by melt extrusion, may be further formed into articles in an appropriate mold. The resin composition may be melt molded directly into an article such as container or cap of bottle. The composition may be extruded to prepare a cylinder parison from which a container such as bottle is formed by blow molding in an appropriate mold.

The film or sheet may be laminated with any other substrate such as plastic film, paper sheet, metal foil or fibrous web (e.g. woven, knitted or nonwoven fabric) to form a composite laminate with the specific properties desired for a particular use. Lamination for this purpose may be achieved for example, by a wet lamination method comprising the steps of applying an adhesive to the surface of film, interposing it with a substrate and heating them optionally under a slight pressure; by a dry lamination method comprising the steps of coating an adhesive on the surface of film, drying the adhesive by heat, interposing the film with a substrate and bonding them under a pressure at an elevated temperature; by hot melt bonding without adhesive; or by extrusion lamination.

As mentioned hereinbefore, the present vinylidene chloride resin contains about 0.5 — about 10% by weight of glycidyl methacrylate component as an internal heat stabilizer, about 95 — about 70% by weight of vinylidene chloride component and the balance of at least one other copolymerizable vinyl monomer component. Where the glycidyl methacrylate component is less than about 0.5% by weight of the resin, no significant improvement in thermal stability is achieved. On the other hand, if the glycidyl methacrylate component is present in a concentration of more than about 10% by weight of the resin, gas permeability and water vapor transmission of film or sheet prepared from the resin will be increased and moldability of the resin will be adversely affected. Therefore, the present resin contains preferably about 0.5 — about 10%, more preferably about 1.5 — about 4%, by weight of glycidyl methacrylate component.

The concentration of vinylidene chloride component in the resin is not critical. However, a concentration of vinylidene chloride component less than about 70% by weight tends to increase gas permeability and water vapor transmission of file or sheet materials prepared from the resin. On the other hand, more than about 95% by weight of vinylidene chloride component may cause significant difficulties in forming or molding the resin. Preferably, the present resin contains about 95 — about 70%, more preferably about 90 — about 80%, by weight of vinylidene chloride component.

The present copolymer resin may be produced by polymerization of the specified proportions of components in liquid phase using any conventional technique. Preferably the present copolymer resin is prepared by suspension polymerization.

In the polymerization of a mixture comprising glycidyl methacrylate monomer, vinylidene chloride monomer and at least one other copolymerizable vinyl monomer, the glycidyl methacrylate is the most reactive monomer and will be polymerized completely. While the vinylidene chloride and other monomer may be reacted usually at a conversion ratio between only about 70 - 80% by weight. Thus a copolymer containing glycidyl methacrylate component in a proportion greater than that of the initial reaction mixture will be produced and the relative proportions of components in the reaction mixture will become different from the initial proportions in the course of reaction.

The proportion of glycidyl methacrylate component in the product copolymer depends mainly on the relative proportions of the three components in the reaction mixture and the conversion ratio of reaction mixture. The proportion of vinylidene chloride component attained in the product may be predetermined readily by routine experiments in which mixtures of different relative proportions of vinylidene chloride and other monomer are polymerized in the absence of glycidyl methacrylate.

In order to obtain a product containing a predetermined proportion of glycidyl methacrylate component, the glycidyl methacrylate reactant is preferably fed to the reaction zone intermittently in appropriate aliquots, or continuously at a suitable rate.

Examples of the copolymerizable vinyl monomer which may be used for the production of the present copolymer include vinyl chloride; vinyl esters such as acrylonitrile and vinyl acetate; and acrylates such as methylacrylate. Preferably vinyl chloride is employed. If desired, a polyfunctional monomer such as ethylene dimethacrylate may be introduced additionally into the polymer to improve the properties thereof by crosslinking the thus introduced polyfunctional component in the polymer chain.

As the present resin has improved thermal stability due to the presence of internal heat stabilizer glycidyl methacrylate in the polymer chain, it may be subjected to extrusion or any other forming process without further addition of heat stabilizer. It is preferred, however, that a suitable lubricant, which may be a conventional one, be added to the resin when extruded. If necessary, additives such as a light stabilizer may be added to the resin. Optionally, any colorant or pigment may be added to the resin.

The present resin may be extruded through extruders which have been used for the extrusion of the conventional vinylidene chloride resins. Further, the improved thermal stability of the present resin enables one to use extruders for vinyl chloride resin which are operated usually under conditions severer than those with the vinylidene chloride resin extruders.

It is known that glycidyl methacrylate is used as an anchoring agent in synthetic resin-based coating materials such as an adhesive, paint and primary coat. For examples, the Dow Chemical Japanese Patent Publication No. 15913/69 (corresponding to Japanese Patent Application No. 5925/65) discloses a regenerated cellulose film which is coated with a coating composition comprising a terpolymer of glycidyl methacrylate, vinylidene chloride and a copolymerizable monoethylenically unsaturated monomer. The Japanese Patent Publication exemplifies that the terpolymer may be prepared by emulsion polymerization technique comprising the steps of emulsifying the three monomers in aqueous phase by means of surfactant, initiating the polymerization of emulsified monomers by means of water soluble initiator and continuing the polymerization for 10 hours.

In general, emulsion polymerization or copolymerization of vinylidene chloride may be completed in a relatively short reaction time, for example about 5 - 20 hours. It is expected that, within such a short period of time, a polymerization degree of at most about 500 may be attained in the product polymer. In contrast with the above, suspension polymerization by which the present resin is preferably produced, may be continued usually for about 40 - 80 hours to produce a product of a polymerization degree as high as about 1,000 - 1,500.

Further said Japanese Patent Publication describes that the terpolymer may be applied, in the form of solution or emulsion, to a substrate and that the glycidyl methacrylate acts as anchoring agent.

Apparently the above points distinguish the present invention over the invention of Japanese Patent Publication No. 15913/69.

EXAMPLES

The following examples are set forth to illustrate more clearly the present invention but are not intended to restrict the scope of the present invention.

Flow Test

Flow test of resin was carried out in Koka flow tester* provided with an orifice of 1 mm diameter and 1 mm length, using a load of 100 kgs./cm$^2$ at a heating rate of 1° C/min.

(* "A Guide To The Testing Of Rheological Properties With Koka Flow Tester" by Teikichi Arai (Maruzen Company, Tokyo, 1958)

Thermal Stability

Thermal stability of resin was determined in the following manner. To the surface of a polished stainless steel plate (JIS-SUS27 corresponding to AISI Type No. 304; 15 × 45 × 0.4 mm), vinylidene chloride copolymer resin was welded as a layer of about 200 - 300 microns thick by means of hot press. The thus obtained resin layer on the steel plate was then positioned on a Geer's oven at 160° C for 5, 10, 20 and 30 minutes. At the end of each period of time, the resin layer was stripped from the steel plate. And change in color of the layer was observed. The results were classified into the following 7 grades depending on the degree of color change.

| Grade | Color |
|-------|-------|
| 1 | from clear to pale yellow |
| 2 | pale ocher |
| 3 | light ocher |
| 4 | ocher |
| 5 | light brown |
| 6 | brown |
| 7 | dark brown |

As a control, a commercially available vinylidene chloride copolymer composition was tested in the same procedure. Analysis of the control composition was found to be;

| vinylidene chloride | 87% (W/W) |
|---|---|
| vinyl chloride | 13% (W/W) |
| additives (heat stabilizer, plasticizer, etc.) | about 10 PHR |

The results with the control were as follows:

| Time (min.) | Grade |
|---|---|
| 0 | 1 |
| 5 | 2 |
| 10 | 3 |
| 20 | 5 - 6 |
| 30 | 6 |

The results were used for rating thermal stability of the present resin. The thermal stability was rated by comparing collectively the grades of color which were determined with the control and the present resin respectively in each of the test times (0, 5, 10, 20 and 30 mins.).

Rating A of thermal stability means that the extent of color change of the resin is comparatively less than that of the control. Rating B is given where both the extents of color change are substantially equal. Rating C means that the color change, when compared to that of the control, is more significant.

Gas Permeability

Gas permeability was measured according to IPRI method using oxygen gas at 20° C and at relative humidities 0 and 90%. The results were calculated as permeability with film of 10 microns thick.

Water Vapor Transmission

Water vapor transmission was treated at 40° C with a film which was positioned as a diaphragm between a chamber (at 90% relative humidity) and another chamber (at 0% rel. humidity). The results were calculated as water vapor transmission with film of 100 microns thick.

EXAMPLE 1

To a 50 liter-autoclave, 12.0 kgs. of vinylidene chloride (VD), 2.52 kgs. of vinyl chloride (VD) and 0.48 kgs. of glycidyl methacrylate (GMA) were charged and stirred at 20° C to obtain a homogeneous mixture. A solution of 32 grams azo-bis-isobutylonitrile (AIBN) in a VD/VC liquid (0.8 kgs. VD and 0.2 kgs. VC) at − 10° C was added to the mixture and stirred thoroughly.

Then, 32 kgs. of an aqueous solution containing 16 grams of carboxyl methyl cellulose (CMC) was added to the mixture.

Then the mixture was again stirred and heated up to 55° C. While maintaining the temperature at 55° C either by heating or cooling, the copolymerization was continued for 46 hours to give 12.3 kgs. of the product copolymer. Analysis of the thus obtained product is shown in the table below.

In the flow test, the resin was found to commence flowing at 131° C and to drain off at 147° C.

The resin was compounded with 2 PHR of lubricant and 0.5 PHR of light stabilizer. The compounded resin was extruded successfully into a parison through an extruder which has been employed conventionally with VC resin.

The parison was blow molded into a film of about 12 microns thick. Gas permeability of the film (calculated as a film of 10 microns thick) was 0.20 cm$^3$/m$^2$.hr.atm. with oxygen gas at 0% RH and 20° C and 0.25 cm$^3$/m$^2$.hr.atm. with oxygen gas at 90% RH and 20° C. This permeability was found to be only about 10% of that of the conventional resin.

Water vapor transmission of the film (calculated as a film of 100 microns thick) was 0.6 gms./m$^2$.24 hrs. (RH 90% - 10%) at 40° C and was found to be significantly less than that of the conventional resin.

EXAMPLE 2

The procedure of Example 1 was repeated except that the different proportions of reactants were used as indicated in the table. The results are shown in the table.

EXAMPLE 3 - 8

In each of these Examples the procedure of Example 1 was repeated except that different proportions of reactants were employed and the copolymerization was conducted substantially at a predetermined pressure as indicated in the table. The pressure was regulated by releasing the reactant gas mixture from the vessel through a valve when the pressure exceeded the predetermined valve during the reaction. The pressure at which the gas mixture was released is shown as "release pressure" in the table.

The results of Examples 1 - 8 are summarized in the following table.

Table

| Example | Charged monomer | | | Initiator | Additional liquid VD/VC used for solving AIBN | | Release pressure (kg/cm$^2$.g) | Yield (kg) |
|---|---|---|---|---|---|---|---|---|
| | VD (kg) | VC (kg) | GMA (kg) | AIBN (gm) | VD (kg) | VC (kg) | | |
| 1 | 12.0 | 2.52 | 0.48 | 32 | 0.8 | 0.2 | — | 12.3 |
| 2 | 12.0 | 2.68 | 0.32 | 32 | 0.8 | 0.2 | — | 12.3 |
| 3 | 10.66 | 4.02 | 0.32 | 40 | 0.7 | 0.3 | 4.19 | 11.5 |
| 4 | 10.82 | 4.02 | 0.16 | 40 | 0.7 | 0.3 | 4.20 | 11.8 |
| 5 | 10.5 | 3.86 | 0.64 | 40 | 0.7 | 0.3 | 4.10 | 11.2 |
| 6 | 10.1 | 3.86 | 1.04 | 40 | 0.7 | 0.3 | 4.07 | 10.88 |
| 7 | 9.86 | 3.86 | 1.28 | 40 | 0.7 | 0.3 | 4.05 | 10.64 |

Table-continued

| Example | Charged monomer VD (kg) | VC (kg) | GMA (kg) | Initiator AIBN (gm) | Additional liquid VD/VC used for solving AIBN VD (kg) | VC (kg) | Release pressure (kg/cm².g) | Yield (kg) |
|---|---|---|---|---|---|---|---|---|
| 8 | 10.82 | 4.15 | 0.03 | 40 | 0.7 | 0.3 | 4.27 | 12.0 |

VD; vinylidene chloride, VC; vinyl chloride,
GMA; glycidyl methacrylate, AIBN; azo-bis-isobutylonitril
*calculated as a film of 10µ thickness (cm³/m² · hr· atm)
**calculated as a film of 100µ thickness (gm/m² · 24 hrs. (90% RH ⟶ 0% RH))

| Product analysis (% by wt.) | | | Thermal stability | Oxygen gas permeability (at 20° C)* | | Water vapor transmission** at 40° C | Odor |
|---|---|---|---|---|---|---|---|
| VD | VC | GMA | | 0% RH | 90% RH | | |
| 82.1 | 14.0 | 3.9 | A | 0.20 | 0.25 | 0.6 | none |
| 83.1 | 14.3 | 2.6 | A | 0.15 | 0.19 | 0.5 | none |
| 83.3 | 13.9 | 2.8 | A | 0.15 | 0.19 | 0.6 | none |
| 84.7 | 13.9 | 1.4 | B | 0.16 | 0.20 | 0.4 | none |
| 80.9 | 13.4 | 5.7 | A | 0.20 | 0.26 | 0.8 | none |
| 80.4 | 10.0 | 9.6 | A | 0.35 | 0.43 | 1.0 | none |
| 79.2 | 8.8 | 12.0 | A | 0.15 | 1.50 | 1.5 | none |
| 87.2 | 12.5 | 0.3 | C | — | — | — | like HCl |

These results show that the present resin has significantly improved thermal stability and that the film prepared therefrom has decreased gas permeability and decreased water vapor transmission.

The oxygen gas permeabilities observed in Example 1 - 5 are about 10% or less those of the conventional vinylidene copolymer films. The film of Example 6 has an oxygen gas permeability of about 20% of the conventional ones. The water vapor transmission of the present resin is about half that of the conventional resins (Example 1 – 6). Examples 7 – 8 were conducted with resins which contained respectively a proportion of glycidyl methacrylate outside the specified range. The gas permeability of film according to Example 7 is substantially the same as that achieved by the conventional resins. The resin of Example 8 in which the amount of glycidyl methacrylate contained is less than the specified lower limit had a thermal stability inferior to the conventional resins so that when it was extruded it decomposed emitting an HCl-like odor and no satisfactory film was obtained.

What we claim is:

1. A molding composition which is normally solid, said composition comprising a thermoplastic resin having a polymerization degree of from 1000 to 1500 prepared by suspension copolymerizing in liquid phase of monomers consisting essentially of from about 0.5% to about 10% by weight of glycidyl methacrylate monomer as an internal heat stabilizer, from about 70% to about 95% by weight of vinylidene chloride monomer and the balance vinyl chloride monomer.

2. A composition according to claim 1 to which a lubricant is added.

3. A composition according to claim 1 to which a light stabilizer is added.

4. A composition according to claim 1 to which a lubricant and a light stabilizer added.

5. A composition according to claim 1 to which a colorant is added.

6. Packaging materials formed from the composition of claim 1.

7. Film formed from the composition of claim 1.

8. Sheet formed from the composition of claim 1.

9. A container formed from the composition of claim 1.

10. A laminate comprising at least one layer of film or sheet molded from the composition of claim 1 and at least one other layer.

11. A laminate according to claim 10 in which the other layer is selected from the group consisting of plastic film, metal foil, paper sheet and fibrous web.

* * * * *